(12) United States Patent
Cabraja

(10) Patent No.: US 7,320,737 B2
(45) Date of Patent: Jan. 22, 2008

(54) CUSHION FORMING APPARATUS AND METHOD OF USE

(75) Inventor: Mark S. Cabraja, Sharon, PA (US)

(73) Assignee: Tiger Sales, Inc., Sharon, PA (US)

( * ) Notice: Subject to any disclaimer, the term of this patent is extended or adjusted under 35 U.S.C. 154(b) by 469 days.

(21) Appl. No.: 10/978,912

(22) Filed: Nov. 1, 2004

(65) Prior Publication Data
US 2005/0161151 A1 Jul. 28, 2005

Related U.S. Application Data

(60) Provisional application No. 60/516,010, filed on Oct. 31, 2003.

(51) Int. Cl.
B32B 37/10 (2006.01)

(52) U.S. Cl. ............ 156/202; 156/216; 156/222; 156/223; 156/285; 156/381; 156/382; 156/479; 156/493; 156/556; 156/64; 156/378; 156/368

(58) Field of Classification Search ............ None
See application file for complete search history.

(56) References Cited

U.S. PATENT DOCUMENTS

| | | | |
|---|---|---|---|
| 2,995,972 A | 8/1961 | Baalson | |
| 3,146,143 A | 8/1964 | Bolesky | |
| 3,283,346 A | 11/1966 | Marshall et al. | |
| 3,318,636 A * | 5/1967 | Callum | 297/452.17 |
| 3,325,329 A | 6/1967 | Bolesky | |
| 3,487,134 A | 12/1969 | Burr | |
| 3,499,065 A | 3/1970 | Hoskinson | |
| 3,616,171 A | 10/1971 | Hoskinson | |
| 3,662,041 A | 5/1972 | Hartman | |
| 3,823,980 A | 7/1974 | Hamick | |
| 3,873,654 A | 3/1975 | Smith | |
| 3,927,161 A | 12/1975 | Powell | |
| 3,996,091 A * | 12/1976 | Daunt et al. | 156/285 |
| 4,089,919 A | 5/1978 | Sanson | |
| 4,102,975 A | 7/1978 | Doerer | |
| 4,403,356 A | 9/1983 | Urai | |
| 4,421,589 A * | 12/1983 | Armini et al. | 156/382 |
| 4,541,885 A | 9/1985 | Caudill, Jr. | |
| 4,585,961 A | 4/1986 | Daubert | |
| 4,753,480 A | 6/1988 | Morell | |
| 4,758,294 A | 7/1988 | Storch | |
| 4,876,055 A | 10/1989 | Cattanach | |
| 4,883,987 A | 11/1989 | Fattaruso | |
| 4,885,317 A | 12/1989 | Thein et al. | |
| 4,891,085 A | 1/1990 | Mulligan | |
| 4,942,399 A | 7/1990 | Buchholtz et al. | |
| 5,000,805 A | 3/1991 | Lowe | |

(Continued)

Primary Examiner—Jessica Ward
(74) Attorney, Agent, or Firm—Blynn L. Shideler; Krisanne Shideler; BLK Law Group

(57) ABSTRACT

A cushion forming apparatus includes a frame with a pivoted hold down member and a pneumatic bladder below the hold down member. The bladder is alternately connectable with a source of pressure and to atmosphere through control valve. The components of a cushion sub-assembly are loaded onto the deflated bladder, the hold down member is lowered to the locked position, the bladder is inflated to force a cover around foam blocks and adjacent a base, the cover is attached to the side edges of the base, the bladder is deflated, the hold down member released and the assembled structure removed.

11 Claims, 3 Drawing Sheets

U.S. PATENT DOCUMENTS

| | | | | |
|---|---|---|---|---|
| 5,001,372 A | | 3/1991 | Nyqvist | |
| 5,021,693 A | | 6/1991 | Shima | |
| 5,039,880 A | | 8/1991 | Astegher et al. | |
| 5,047,666 A | | 9/1991 | Astegher et al. | |
| 5,076,880 A | | 12/1991 | Spengler et al. | |
| 5,096,529 A | | 3/1992 | Baker | |
| 5,130,578 A | | 7/1992 | Stone et al. | |
| 5,158,634 A | | 10/1992 | Kasuya | |
| 5,232,653 A | | 8/1993 | Addeo et al. | |
| 5,238,513 A | | 8/1993 | Gill | |
| 5,238,514 A | | 8/1993 | Tornero | |
| 5,252,164 A | | 10/1993 | Mills | |
| 5,338,386 A | * | 8/1994 | Frelich et al. | 156/290 |
| 5,344,211 A | | 9/1994 | Adat et al. | |
| 5,407,510 A | | 4/1995 | Marfilius et al. | |
| 5,425,836 A | | 6/1995 | Shimada et al. | |
| 5,562,873 A | | 10/1996 | Tornero | |
| 5,686,035 A | | 11/1997 | Tornero | |
| 5,968,306 A | * | 10/1999 | Kleinhenz et al. | 156/290 |
| 6,068,808 A | | 5/2000 | Tornero | |
| 6,146,578 A | * | 11/2000 | Van Ert et al. | 264/510 |
| 6,365,087 B2 | | 4/2002 | Tornero | |

* cited by examiner

CUSHION FORMING APPARATUS AND METHOD OF USE

RELATED APPLICATIONS

The present application claims the benefit of provisional patent application Ser. No. 60/516,010 filed Oct. 31, 2003 which is incorporated herein by reference.

BACKGROUND OF THE INVENTION

1. Field of the Invention

The present invention relates to a cushion forming apparatus and method of use therefore.

2. Background of the Invention

Polyurethane foam and other resilient materials have been used for seat cushions for many years in the upholstered furniture industry. Foam blocks of various dimensions and densities are cut then covered with fabric to form seat cushions for sofas, chairs and other furniture. Additionally, chair and sofa frames are likewise often partially wrapped with resilient foam prior to covering with a selected fabric to achieve the desired contours and appearance. It is also know to preassemble foam covered components, also known as a sub-assembly, at various shops which are then finally assembled as a cushion at a central plant to expedite the manufacturing process. For example, upholstered chair manufacturers may contract through "outside" sources to purchase a partial chair seat sub-assembly consisting of a wooden base having at least one contoured foam block glued thereto. The furniture maker, after receiving this sub-assembly, will cover it with a fabric and subsequently attaches it to a finished chair frame. A large number of such partial seat assemblies may be kept on hand by the furniture manufacturer so changes to the fabric type or style can be quickly made depending on the customer's needs.

Cushion sub-assemblies and finished cushion assemblies are considered cushions within the meaning of this application. In general a cushion sub-assembly will have an outer foam layer (e.g. a thin foam cover) whereas a finished cushion assembly will have an outer fabric layer (e.g. leather, fabric, etc.). Of course, a cushion sub-assembly will be made into a cushion assembly by adding a desired outer fabric layer over the outer foam layer. There are some finished cushions that are not formed over a cushion sub-assembly (i.e. they do not have a foam cover).

Examples of cushion forming apparatus are found in U.S. Pat. Nos. 6,365,087, 6,068,808, 5,562,873, 5,238,514, 3,325,329, 3,283,346 and 3,146,143. Several of these patents utilize a vacuum seal with a flexible membrane that is pulled around the cushion. It is difficult to maintain an appropriate seal and to draw enough of a vacuum. In addressing these problems, other of these patents utilize a ram pressing the components of a cushion into a membrane from behind. With a pressing into the membrane the forces or tension is along the deflected membrane such that the forces forming the cushion are a component of the tension in the membrane. Further the membrane on a rigid frame cannot be used to wrap around a cushion structure (i.e. beyond a vertical position).

There remains a need in the art to provide a simple, universal cushion forming apparatus and method. It is the object of the present invention to improve upon the prior art. With the known disadvantages and problems associated with the prior art seat cushion assemblies, the present invention was conceived and one of its objectives is to provide a distortable seat cushion mold that will allow a manufacturer to produce an attractive, uniform and consistent seat on each chair manufactured.

It is another objective of the present invention to provide a seat cushion that will allow the upholsterer ease and convenience in covering the cushion. It is still another objective of the present invention to provide a seat cushion that has no unsightly underlines and one that is contoured evenly throughout. It is yet another objective of the present invention to provide a method for forming a seat cushion in which a plurality of synthetic foam components are attached to a rigid base to form a smooth, even crown. It is still another objective of the present invention to provide a method for forming a seat cushion whereby a distortable seat cushion mold is used to insure uniformity in the crown.

Various other objectives and advantages of the present invention become apparent to those skilled in the art as a more detailed presentation of the invention is set forth below.

SUMMARY OF THE INVENTION

A cushion forming apparatus according to the present invention addresses the problem with the above cited prior art and includes a frame with a moveable hold down member and a pneumatic bladder below the hold down member. The bladder is alternately connectable with a source of pressure and to atmosphere through control valve. The apparatus forms a conventional cushion sub-assembly that can generically be referred to as a cushion.

Initially the components of the sub-assembly are placed onto the deflated bladder with the hold down member in an open loading position. The hold down member is then moved to the locked position with a latch engaging the frame. The bladder is inflated to force a cover around foam blocks of the cushion sub-assembly to a position adjacent a cushion sub-assembly base. The cover is attached to the side edges of the base, such as through adhesive. After a curing or setting period, the bladder is deflated, or vented to atmosphere. Once the bladder is sufficiently deflated, the latch can be released to raise the hold down member to an unloading position. The assembled cushion sub-assembly can then be removed and the excess of the cover is trimmed. The process may be repeated for forming further cushions.

A variety of automation and safety features are available in the apparatus of the invention. These features and other advantages will be clarified in the brief description of the preferred embodiment which is described in connection with the attached schematic figures in which like reference numeral represent like elements throughout.

These and other advantages of the present invention will be clarified in the detailed description of the preferred embodiment taken together with the attached drawings.

DESCRIPTION OF THE PREFERRED EMBODIMENTS

Figure 1:
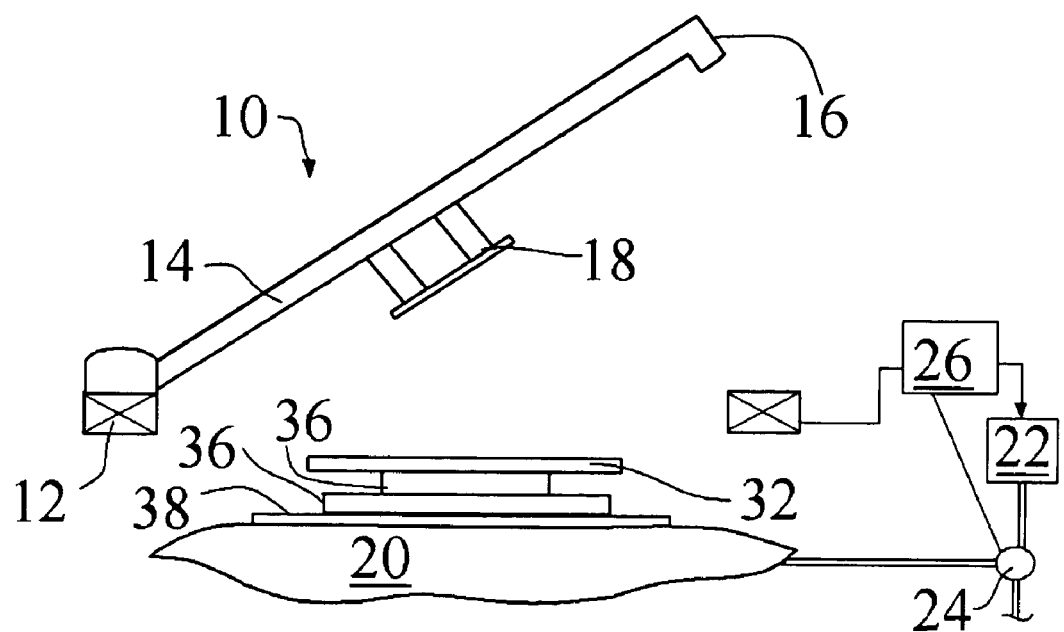
FIG. 1 is a sectional schematic view of a cushion forming apparatus according to the present invention with the cushion forming apparatus in a loading position.

FIGS. 1-5 illustrate a cushion forming apparatus 10 according to the present invention. The cushion forming apparatus 10 includes a frame 12. The frame 12 may be a rectangular box shaped structure, or other suitable shape that secures the apparatus 10 to a work surface (not shown) such as a table or floor. A hold down member 14 pivots on the frame 12 between an open position, shown in FIGS. 2 and 6 for loading and unloading of the apparatus 10, and a closed position shown in FIGS. 3-5. The hold down member 14 has a latch 16 engaging with the frame 12 to lock the hold down member 14 in the closed position. The latch 16 may be constructed in any number of conventional fashions. The hold down member 14 includes an adjustable engagement member 18 adjustable attached thereto for engaging the cushion as will be described below.

The apparatus 10 includes a pneumatic bladder 20 below the hold down member 14. The bladder 20 is alternately connectable with a source of pressure 22 and to atmosphere through control valve 24. A controller 26 can be used to control the apparatus 10, as will be described hereinafter.

Figure 6:
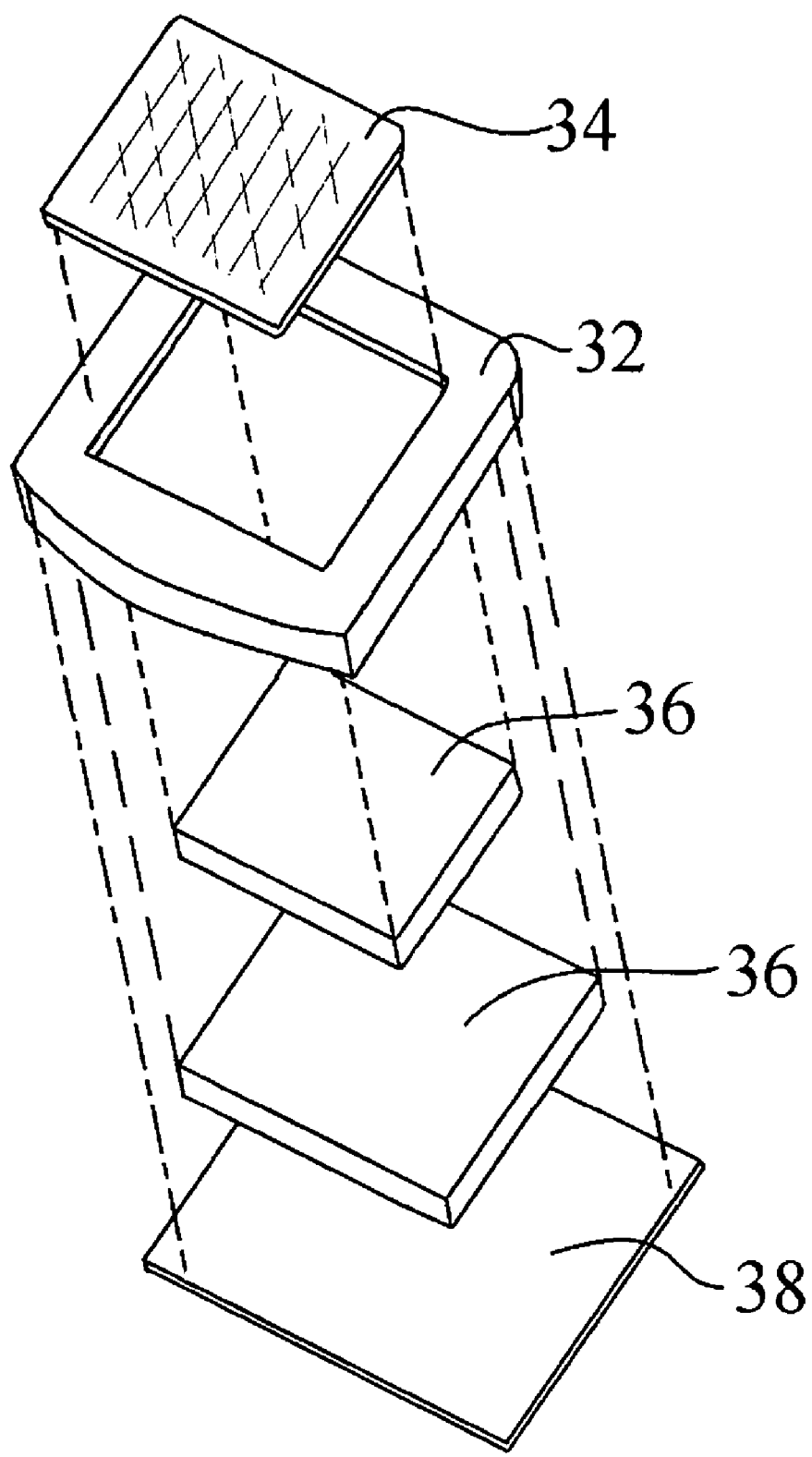
FIG. 6 is an exploded perspective view of a trimmed cushion formed with the cushion forming apparatus according to the present invention.

The apparatus 10 is utilized to form a conventional cushion sub-assembly 30, an exploded view of which is shown in FIG. 6. The cushion sub-assembly 30 includes a base 32 that is shaped in accordance with the general plan view of the cushion sub-assembly 30. The base 32 is generally a wooden frame structure with the shape varying considerably between cushion types. Although plywood and pressboard are often used other materials are possible for the base 32. Each style of seat is likely to have a distinctly shaped base 32. The perimeter of the rigid base 32 is what is needed to give shape to the cushion sub-assembly 30, such that the inner portion of the base 32 is omitted for weight savings and is covered by webbing 34. Alternatively the entire base 32 may be a solid structure. At least one, and generally a plurality of foam blocks 36 are attached to the base 32. The number and types of foam blocks 36 are selected to vary the density and resiliency of the resulting cushion sub-assembly 30 as known in the art. A thin, typically polyurethane foam cover 38 is fixed to the side edges of the base 32 such as through adhesive, to complete the sub-assembly 30. FIG. 6 is an exploded view of a complete cushion sub-assembly 30 such that the cover 38 is trimmed. Once assembled the sub-assembly may be covered with any desired fabric or covering to complete the cushion for furniture construction.

The apparatus 10 will form the sub-assembly 30 as follows. Initially the components of the sub-assembly 30 are placed onto the deflated bladder 20 with the hold down member in the loading position shown in FIG. 1. The webbing 34, if present, will be previously attached to the base 32. Additionally, adhesive will be generally previously applied to at least the periphery of the cover 38 that is to be attached to the side edges of the base 32. No further pre-assembly, other than properly stacking the base 32, foam blocks 36 and cover 38 is required.

Figure 2:
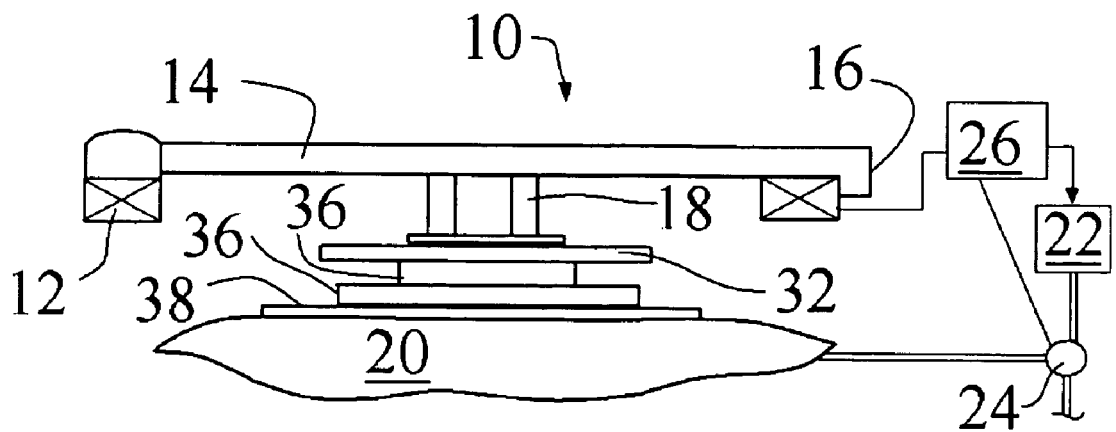
FIG. 2 is a sectional schematic view of the cushion forming apparatus according to FIG. 1 with the cushion forming apparatus in the beginning of an inflation/deflation cycle.

Following the loading of the apparatus 10, the hold down member 14 is lowered to the locked position with latch 16 engaging the frame 12 as generally shown in FIG. 2. The engaging member 18 is formed as a plate on the end of adjustable stems (e.g. threaded rods). The plate of engaging member 18 is sized to engage the rear of the base 32 spaced from the peripheral edges thereof. The engaging member 18 is adjustable in height through adjusting of the stems on the hold down member 14, thereby accommodating cushions of different heights. Further the plate of the engaging member 18 may be sized and replaced to be associated with a different style of cushion (e.g. a larger base 32).

With the latch 16 engaging the frame 12, air can be directed to the bladder 20 from the air source 22 through the valve 24. As a safety feature of the apparatus 10, the controller 26 can require that (1) the latch 16 be engaged, and (2) the operator must have both hands on the controls before the valve is allowed to be actuated. Requiring both hands on the controller 26 prevents the operator from having a hand in the apparatus 10 during inflation.

Figure 5:
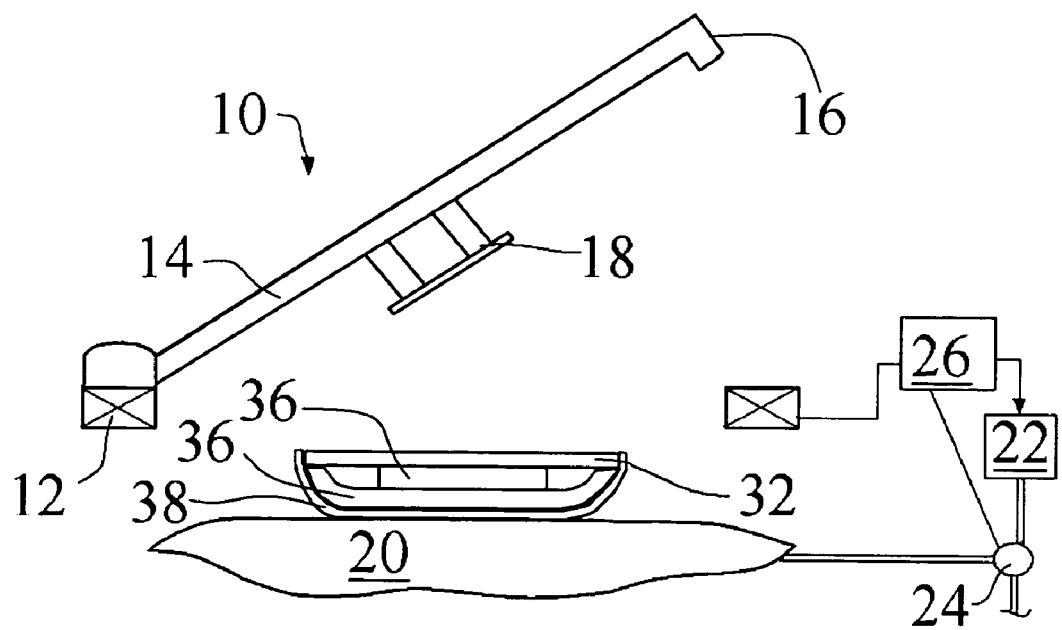
FIG. 5 is a sectional schematic view of the cushion forming apparatus according to FIG. 1 with the cushion forming apparatus in an unloading position.
Figure 3:
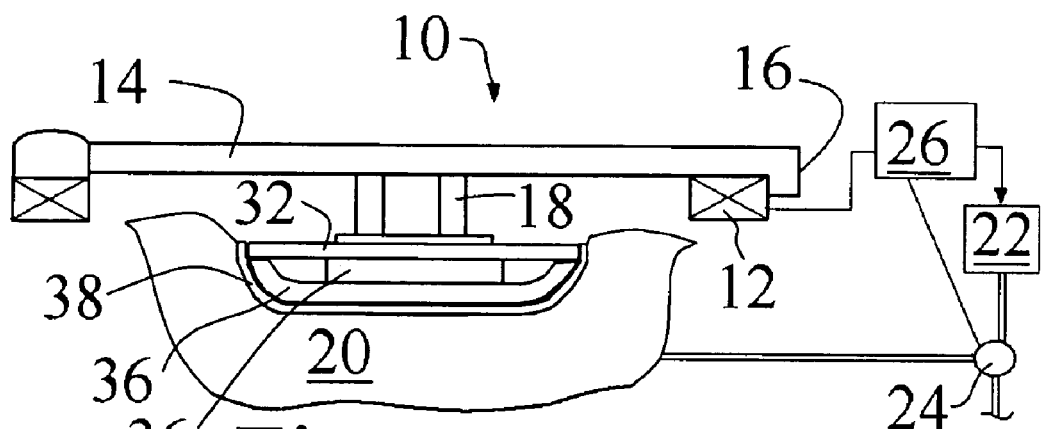
FIG. 3 is a sectional schematic view of the cushion forming apparatus according to FIG. 1 with the cushion forming apparatus in the middle of the inflation/deflation cycle.
Figure 4:
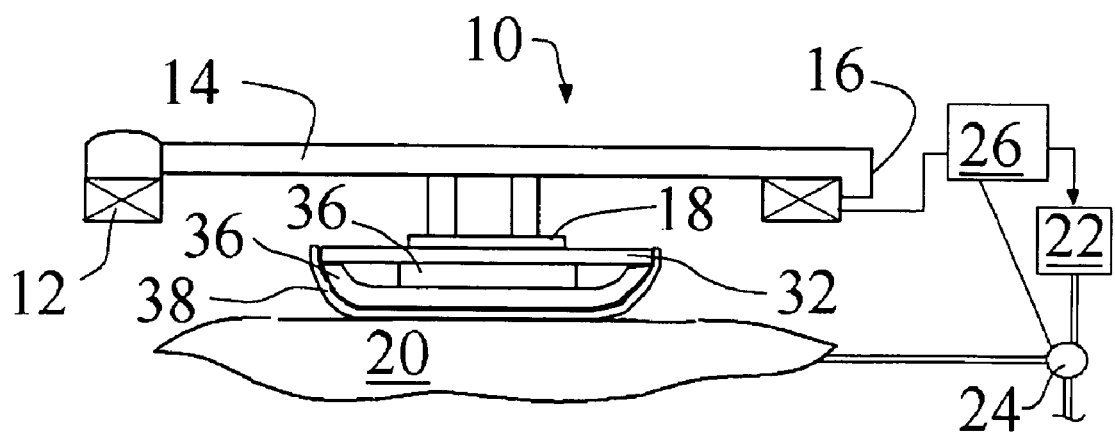
FIG. 4 is a sectional schematic view of the cushion forming apparatus according to FIG. 1 with the cushion forming apparatus in the end of the inflation/deflation cycle and with the assembled cushion being trimmed.

The inflation of the bladder 20 will force the cover 38 around the foam blocks 36 and adjacent the base 32 as generally shown in FIG. 3. In this position the cover 38 can be easily and quickly attached to the side edges of the base 32, such as through adhesive. Alternatively, mechanical fasteners such as staples can connect the cover 38 to the base 32. With the attachment of the cover 36 to the side edges of the base 32 the excess of the cover 36 may be trimmed. The trimming and the attachment of the cover 36 may be manual or may be automated. For example, a roller and trimming knife (not shown) may be run around the periphery of the base 32 manually or through automation. A trimmed cushion is shown in FIGS. 4-6, however the trimming may be deferred until after the assembled cushion 30 is removed from the apparatus. In this assembly operation the assembled, but untrimmed cushion 30 may be placed on a turntable with a trimming knife held against the back of the base 32 and the entire assembly rotated, whereby the base 32 acts as a knife stop or guide for the trimming. The deferral of the trimming allows the easy use of a turntable and further prevents the trimming knife from coming into contact with the bladder 20 (i.e. if the operator slips). Effectively the trimming can be done anytime after the cover 38 is attached and after the adhesive sufficiently cures if adhesive is used.

If adhesives are used, a curing or setting period may be used in which the bladder 20 remains inflated for such period after attachment of the cover 36 to the base 32. After the desired time period, that may be automated, the valve 24 will vent the bladder 20 to atmosphere to deflate the bladder 20 as generally shown in FIG. 5. The controller 26 can, preferably, prevent the latch 16 from being disengaged from the frame 12 while the bladder 20 is under pressure (i.e. inflated). Once the bladder 20 is sufficiently deflated the latch 16 can be released to raise the hold down member 14 to the unloading position as shown in FIG. 6. The assembled cushion sub-assembly 30 can be removed and the process repeated.

Further automation and safety features are available in the apparatus 10 of the invention. For example, the controller 26 may have a kill switch which promptly vents/deflates the bladder and then releases the latch 16. Cycle lights (not shown) can be provided to give visual indication of the portion of the cycle (e.g. a green light for loading and unloading, one red light for inflation, two red lights for attachment/trimming/curing, and three red lights for deflation). A variable timer, set by the operator between a set maximum and minimum, may be used for venting of the bladder 20 after inflation. The timer will set the time to allow the operator to attach the cover 36, trim the cover 36, and allow for sufficient cure time. For example a typical time would be 30 seconds but the operator can adjust this time between 20 seconds and 40 seconds based upon personal preferences.

The apparatus 10 provides a simple assembly system that is adapted to a wide variety of cushion sub-assembly shapes. The assembly 10 is not limited to sub-assemblies 30 but could be used to form cushions in which the foam cover 36 is replaced with a fabric cover. Further the apparatus 10 may be used to attach the cover 36 to the underside of the base 32, however the attachment of the cover 38 to the side of the base 32 is generally deemed preferable in the industry. A pair of apparatus 10 may be used in conjunction with each other to expedite the manufacture, with the cycles offset such that one apparatus 10 is loading/unloading while the other apparatus 10 is in the inflation/deflation cycle. In such a duel apparatus 10 arrangements the discharge of the air from one bladder 10 may be used, through a pump, to inflate the bladder 10 of the other apparatus 10. This recycling of inflating medium may be particularly useful if hydraulic fluid were used in place of air. The simple construction of the apparatus 10 allows for easy repair and maintenance.

The described embodiment is intended to be illustrative of the present invention and not restrictive thereof. There are numerous modifications to the apparatus 10 of the present invention that do not depart form the spirit and scope thereof, and the present invention is intended to be inclusive of these modifications. The scope of the present invention is defined in the attached claims and equivalents thereto.

What is claimed is:

1. A method of forming a cushion having components thereof including a rigid base, at least one foam block and a cover, said method comprising the steps of:
    placing the components of the cushion onto a deflated bladder with a hold down member in an open loading position;
    lowering the hold down member to a closed, locked position with a latch thereon engaging a base frame;
    inflating the bladder through the direction of air into the bladder from an air source to force the cover around the at least one foam block of the cushion to a position adjacent the rigid base;
    attaching the cover to the rigid base;
    deflating the bladder;
    releasing the latch and raising the hold down member to an unloading position; and
    removing the cushion.

2. The method of claim 1 wherein the cover of the cushion is a foam cover and the cushion is a cushion sub-assembly.

3. The method of claim 2 wherein a plurality of blocks are provided in the cushion subassembly.

4. The method of claim 3 wherein the attaching of the cover to the rigid base is though adhesives and further including the step of trimming excess portions of the cover after the assembled cushion is removed.

5. The method of claim 4 further including the step of providing a curing time following the attaching of the cover to the rigid base prior to the deflation of the inflated bladder via venting of the bladder to atmosphere.

6. The method of claim 5 wherein the cover is attached to the side edges of the rigid base.

7. The method of claim 6 further including the step of detecting the locked position of the hold down member prior to inflation of the bladder.

8. The method of claim 7 further including the step of detecting proper operator position prior to inflation of the bladder.

9. The method of claim 8 further including the step of detecting the appropriate deflation of the bladder prior to releasing the latch.

10. The method of claim 9 wherein the trimming of the cover is manual.

11. The method of claim 10 wherein the rigid base is a frame with a webbing central portion.

* * * * *